United States Patent [19]
Olkin et al.

[11] Patent Number: 5,878,220
[45] Date of Patent: Mar. 2, 1999

[54] METHOD AND APPARATUS FOR STORING AND TRANSFERRING DATA ON A NETWORK

[75] Inventors: Jeffrey C. Olkin, Sunnyvale; Mark A. Porter, Woodside, both of Calif.

[73] Assignee: Oracle Corporation, Redwood Shores, Calif.

[21] Appl. No.: 964,422

[22] Filed: Nov. 4, 1997

Related U.S. Application Data

[63] Continuation of Ser. No. 343,092, Nov. 21, 1994, abandoned.

[51] Int. Cl.[6] .................................................. G06F 15/16
[52] U.S. Cl. ............................... 395/200.47; 395/200.33; 395/200.59
[58] Field of Search .................. 395/200.47, 200.33, 395/200.59; 386/46, 125, 126, 129; 348/7, 10, 13

[56] References Cited

U.S. PATENT DOCUMENTS

| | | | |
|---|---|---|---|
| 4,479,195 | 10/1984 | Herr et al. | 395/200.34 |
| 4,479,211 | 10/1984 | Bass et al. | 370/261 |
| 4,653,112 | 3/1987 | Ouimette | 382/128 |
| 4,939,721 | 7/1990 | De Bosio | 370/392 |
| 4,967,326 | 10/1990 | May | 395/800.21 |
| 5,046,027 | 9/1991 | Taaffe et al. | 345/202 |
| 5,127,001 | 6/1992 | Steagall et al. | 370/267 |
| 5,212,724 | 5/1993 | Nazarenko et al. | 455/560 |
| 5,229,992 | 7/1993 | Jurkevich et al. | 370/468 |
| 5,303,238 | 4/1994 | Brodd et al. | 370/402 |
| 5,323,445 | 6/1994 | Nakatsuka | 348/15 |
| 5,341,474 | 8/1994 | Gelman et al. | 395/200.36 |
| 5,371,607 | 12/1994 | Hannina et al. | 358/402 |
| 5,414,455 | 5/1995 | Hooper et al. | 348/7 |
| 5,550,976 | 8/1996 | Henderson et al. | 395/200.31 |

FOREIGN PATENT DOCUMENTS

| | | |
|---|---|---|
| 0449622 | 3/1991 | European Pat. Off. . |

OTHER PUBLICATIONS

The impact of digital audio and video on high–speed storage by Lougher et al., 1994 IEEE publication, pp. 84–89.
The design of a storage server for continuous media by Lougher et al., IEEE publication, pp. 32–42, 1992.
International Search Report, PCT/US95/15528, Dec. 4, 1996.
Nascimento and Dollimore, *Journal of Object–Oriented Programming*, vol. 5, No. 5, pp. 25–33, (1992).

*Primary Examiner*—Zarni Maung
*Attorney, Agent, or Firm*—Blakely, Sokoloff, Taylor & Zafman LLP

[57] ABSTRACT

A data transport system has application for transferring binary large objects (blobs) to one or more clients. The data transport system includes a mass storage device, a high bandwidth network, a blob server and an applications server. The blobs are pre-packetized in a general format compatible with a network protocol in that the packets do not include specific control information that identifies a particular client and a particular request for a blob. At run time, a requesting client generates a request to the applications server to request a blob stored in the mass storage device. In turn, the applications server generates a request, that includes control information to identify the requesting client and the particular request, to the blob server. The blob server accesses the mass storage device to retrieve packets corresponding to the blob requested, and transfers the packets and the control information from the blob server to the requesting client. The requesting client modifies each packet to include the control information, thereby conforming the packets to the network protocol.

18 Claims, 5 Drawing Sheets

METHOD AND APPARATUS FOR STORING AND TRANSFERRING DATA ON A NETWORK

This is a continuation of application Ser. No. 08/343,092, filed Nov. 21, 1994, now abandoned.

FIELD OF THE INVENTION

The present invention relates to the field of data transport, and more particularly to transferring binary large objects in a network environment.

BACKGROUND OF THE INVENTION

In general, the electronic transport of media items has a wide range of applications. For example, the electronic transport of media has application in video transport and multi-media systems. One essential element of both video transport and multi-media systems is the ability to transport large amounts of data. In general, binary large objects (blobs) are defined as large amounts of digital data. For example, blobs may consist of video, audio, graphics, etc. In any video transport system and multi-media system, resources are limited. The lack of resources is a problem when transporting blobs. It is desirable to provide a data transport system that effectively and efficiently supports the transfer of blobs.

A video transport system has the capability to deliver video upon request such that the video transport system sends video streams to large numbers of concurrent users. The video is stored on a disk, and a video server is used to read the video streams from the disk. The video server then transmits the video stream over a network. However, in such a system, the video stream must be transferred in real time. In addition, because the video transport system has limited resources, problems with disk contention and network congestion must be addressed. Therefore, a video transport system that effectively solves these problems is desirable.

Multi-media is defined as the integration of several audio and video production units into a single controllable unit. Multi-media projects cover many communication media types, including printed materials, audio programs, television shows, feature films and many others. The ability to integrate the functions of the resources utilized in the production of multi-media projects into a single shared system provides a level of performance and capability unknown in the prior art. A multi-media system may require access to a central source that stores multi-media data, such as blobs. However, in order to support such a multi-media system, an effective and efficient transport system is required.

SUMMARY OF THE INVENTION

A data transport system has application for transferring binary large objects (blobs) to one or more clients. The data transport system includes a mass storage device for storing the blobs. The blobs are delivered to requesting clients over a high bandwidth network. The data transport system further includes a blob server and an applications server. The blob server is coupled to the mass storage device and the high bandwidth network to deliver blobs over the high bandwidth network. The applications server is coupled to the clients, via a network, to receive requests for blobs, and the applications server is coupled to the blob server to generate client requests.

The blobs are pre-packetized in a general format compatible with a network protocol for the high bandwidth network in that the packets do not include specific control information that identifies a particular client and a particular request for a blob. At run time, a requesting client generates a request to the applications server to request a blob stored in the mass storage device. In turn, the applications server generates a request, that includes control information to identify the requesting client, to the blob server. The blob server accesses the mass storage device to retrieve packets corresponding to the blob requested, and transfers the packets and the control information from the blob server to the requesting client.

After receiving the blob over the high bandwidth network, the requesting client modifies the packets, in accordance with the control information, for each of the packets to conform the packets to the network protocol. Because of this, a blob server efficiently transfers a large number of blobs with only a minimal amount of processing. In one embodiment, the blobs are video data, and the clients are set top converter boxes that receive requested video data.

Other features and advantages of the present invention will be apparent from the accompanying drawings, and from the detailed description that follows below.

BRIEF DESCRIPTION OF THE DRAWINGS

The features, and advantages of the present invention will be apparent from the following detailed description of the preferred embodiment of the invention with references to the following drawings.

DETAILED DESCRIPTION

The data transport system of the present invention has application for transferring binary large objects (blobs). In general, blobs are similar to video data in that the blobs are large as compared to an average message transferred over a data communications network. In addition, blobs and video data are static such that the data does not change over long periods of time. However, blobs differ from video data in that blobs need not be delivered to users in real time. However, blobs must be delivered to the users reliably, such that no data is lost or corrupted. Although the data transport system of the present invention is described in conjunction with a system for transferring blobs, any type of digital data may be transferred without deviating from the spirit and scope of the invention.

DATA TRANSPORT SYSTEM

Figure 1:
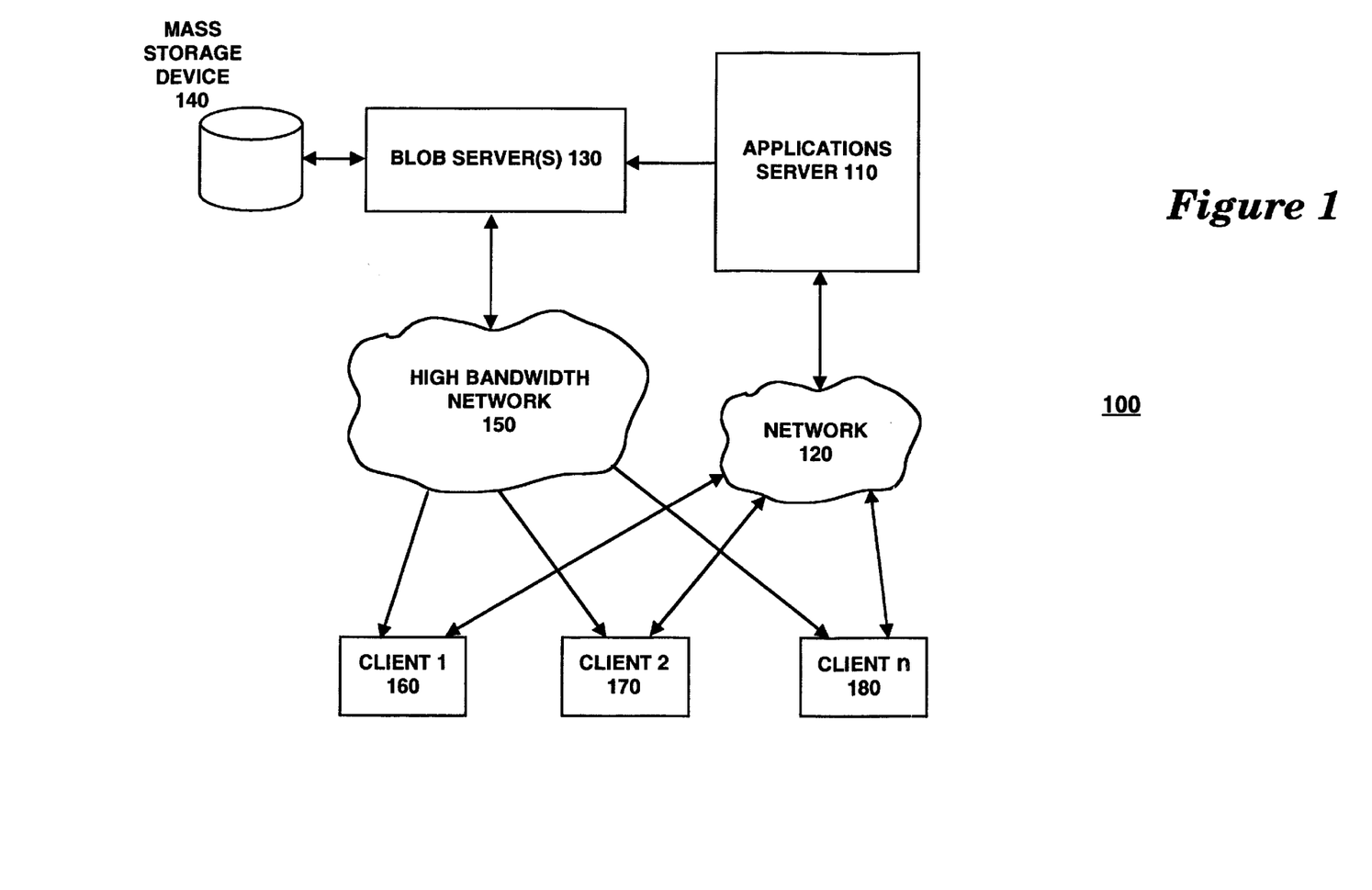
FIG. 1 conceptually illustrates a data transport system configured in accordance with the teachings of the present invention.

FIG. 1 conceptually illustrates a data transport system configured in accordance with the teachings of the present invention. A data transport system 100 contains a plurality of clients (1–n) labeled 160, 170 and 180 on FIG. 1. For the data transport system 100, the clients (1–n) 160, 170 and 180 receive data, such as large binary objects (blobs). In one embodiment, the clients (1–n) 160, 170, and 180 may be configured as set top converter boxes coupled to an output display, such as television. However, clients (1–n) 160, 170 and 180 are intended to represent a broad category of data recipients that may be configured for a wide variety of applications.

As shown in FIG. 1, the data transport system 100 also includes applications server 110 coupled to a network 120. The clients (1–n) 160, 170 and 180, also coupled to the network 120, communicate with the applications server 110 via the network 120. The data transport system 100 further includes a binary large object (blob) server 130, a mass storage device 140, and a high bandwidth network 150. The blob server 130 is coupled to the applications server 110 to receive commands and information. The blob server 130 is coupled to the mass storage device 140 such that the blob server stores and retrieves data from the mass storage device 140. The mass storage device 140 may be any type of device or devices used to store large amount of data. For example, the mass storage device 140 may be a magnetic storage device or an optical storage device. The mass storage device 140 is intended to represent a broad category of non-volatile storage devices used to store digital data, which are well known in the art and will not be described further.

In addition to communicating with the applications server 110, the clients (1–n) 160, 170 and 180 communicate with the blob server 130 via the high bandwidth network 150. The high bandwidth network 150 may be any of type of circuit-style network link capable of transferring large amounts of data. A circuit-style network link is configured such that the destination of the data is guaranteed by the underlying network, not by the transmission protocol. For example, the high bandwidth network 150 may be an asynchronous transfer mode (ATM) circuit, an X0.25 circuit, a physical type of line, such as a T1 or E1 line, or an electronic industry association (EIA) 232 (RS-232) serial line. In addition, the high bandwidth network 150 may utilize a fiber optic cable, twisted pair conductors, coaxial cable, or a wireless communication system, such as a microwave communication system. Also, the high bandwidth network 150 may utilize any underlying reliable protocol that is either stream based or can support messages of arbitrary length to transfer data from the blob server 130 to the clients (1–n) 160, 170, and 180. As is described more fully below, in one embodiment, the high bandwidth network 150 implements a reliable connectionless protocol.

The data transport system 100 of the present invention permits a server, such as the blob server 130, to transfer large amounts of data from the mass storage device 140 over the high bandwidth network 150 to the clients (1–n) 160, 170 and 180 with minimal overhead. In addition, the data transport system 100 permits the clients (1–n) 160, 170, and 180 to request data to the applications server 110 using a standard network protocol via the network 120. In a preferred embodiment, the underlying protocol for the high bandwidth network 150 and the network 120 is the same. The applications server 110 may consist of a single computer system, or may consist of a plurality of computing devices configured as servers. Similarly, the blob server 130 may consist of a single server device, or may include a plurality of such servers. As is explained fully below, the data transport system 100 provides a reliable and effective system for delivering blobs to the clients (1–n) 160, 170 and 180.

Figure 2:
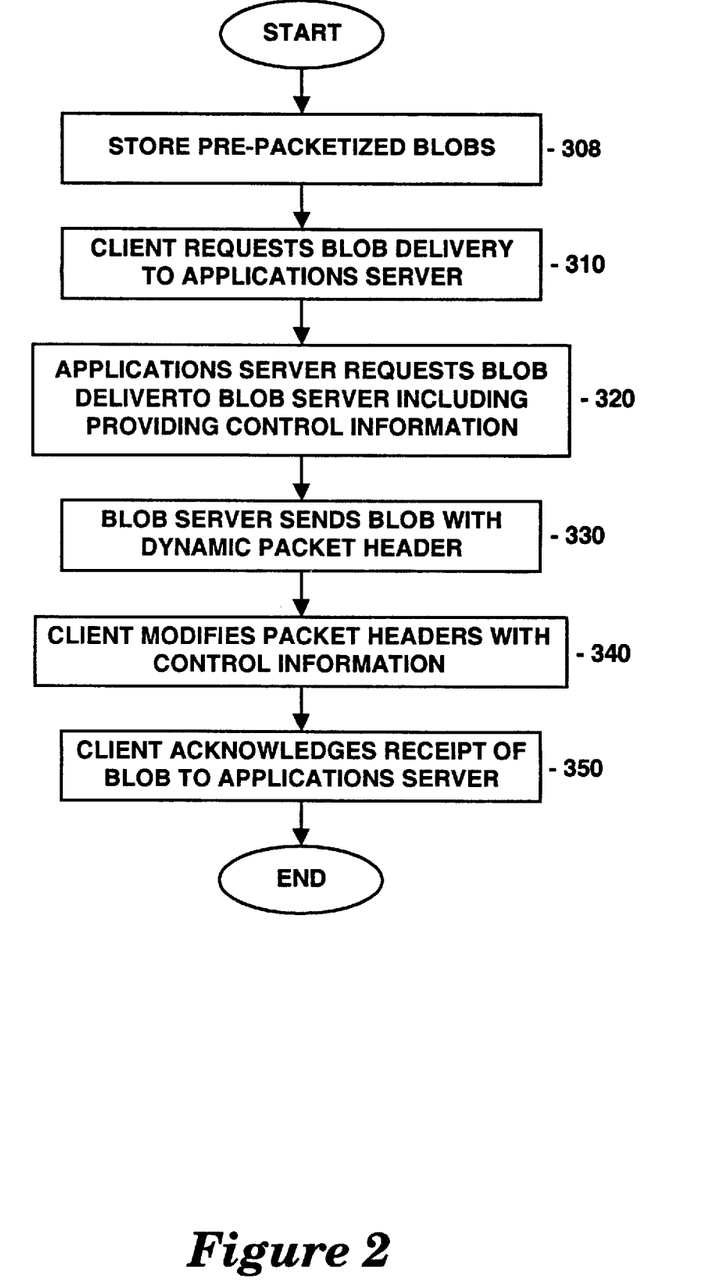
FIG. 2 illustrates a data transport system flow configured in accordance with one embodiment of the present invention.

FIG. 2 illustrates a data transport system flow configured in accordance with one embodiment of the present invention. As shown in block 300, blobs are stored, prior to run time, in the mass storage device 140 in a pre-packetized format (e.g. the blobs are stored in packets including control and data bits). The specific format for the packetization of the blobs conforms to the network protocol specification used to implement the high bandwidth network 150 and the network 120. In a preferred embodiment, the blobs are stored in a pre-packetized format compatible with a modified transmission control protocol/internet protocol (TCP/IP) protocol. Although the blobs are pre-packetized, the blob packets do not contain certain specific control information, such as a destination address (e.g. a designation field is generated for the packet but no specific address is inserted) In this way, the storage of the blobs in the pre-packetized format is generalized for transfer to all clients.

In order to receive blobs, a client (1–n) 160, 170 or 180 generate a request, to the applications server 110, for blob delivery via the network 120 as shown in block 310. In response to a request for blob delivery from one of the clients, the applications server 110 generates a request, to the blob server 130, for the blob delivery. The request for blob delivery from the applications server 110 includes providing control information specific to the client request. For example, the control information identifies the blob requested and the address for the client. The applications server 110 request to the blob server 130 is shown in block 320.

The blob server 130, after receiving the request and control information from the applications server 110, retrieves the blob from the mass storage device 140. In addition, the blob server 130 generates a dynamic packet header based on the control information. The blob server 130 appends the dynamic packet header onto the pre-packetized blob retrieved from the mass storage device 140. The blob server 130 transmits the blob, including the dynamic packet header, to the requesting client via the high bandwidth network 150. The blob server 130 operation is depicted in block 330.

The requesting client receives the blob including the dynamic packet header. As shown in block 340, the requesting client modifies the packetized blob with the control information contained within the dynamic packet header. After the requesting client modifies the blob packets, the resultant packets conform with the standard network protocol. In accordance with the network protocol, the requesting client acknowledges receipt of the blob to the applications server 110 as shown in block 350. Alternatively, if one or more blob packets are lost or corrupted, the requesting client acknowledges only the portion of the blob properly received.

Figure 3:
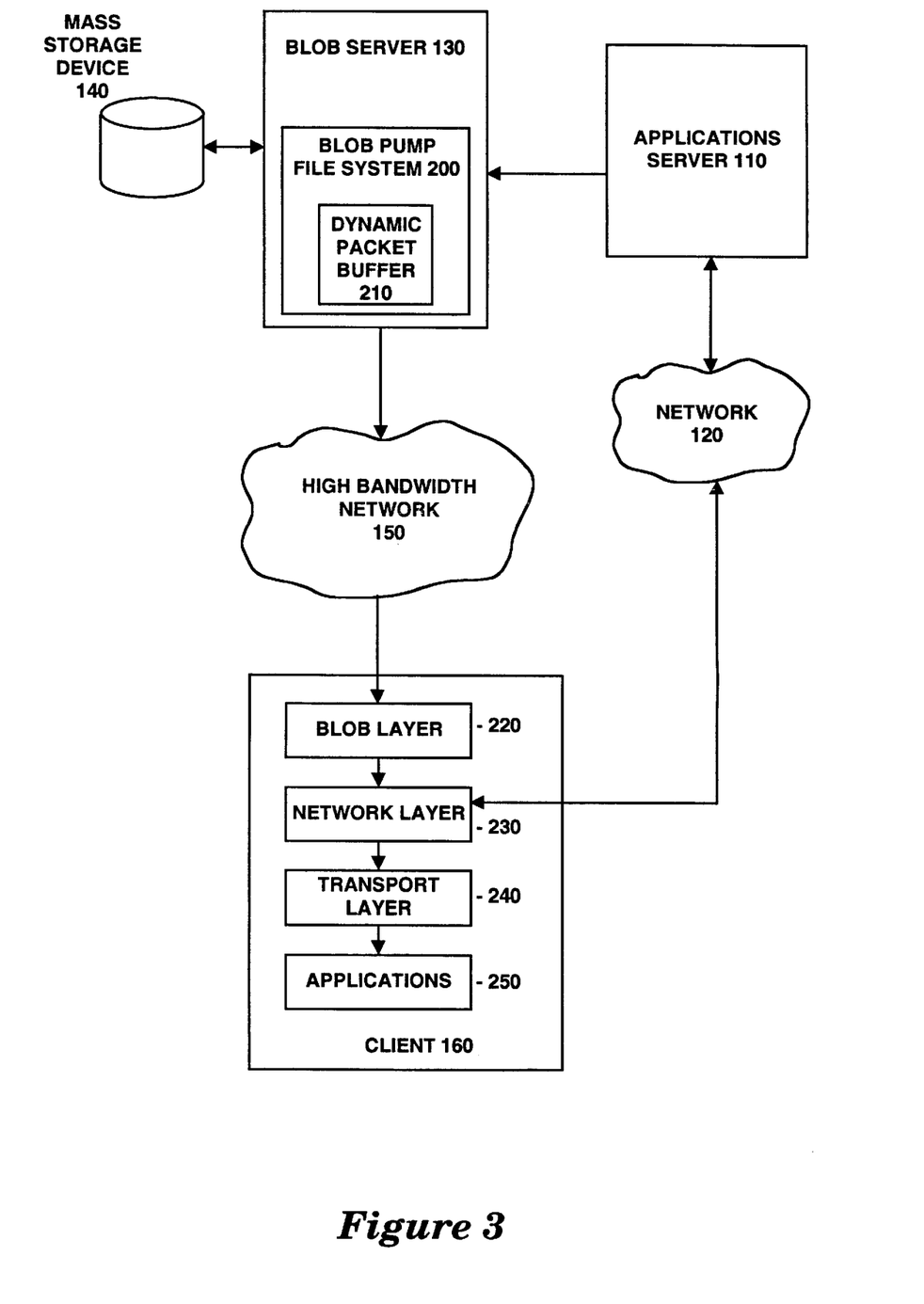
FIG. 3 is a block diagram illustrating the data transport system of the present invention.

FIG. 3 is a block diagram illustrating the data transport system of the present invention. For purposes of explanation, the data transport system illustrated in FIG. 3 contains a single client 160. The client 160 is configured to receive blobs from the high bandwidth network 150, and transmit and receive data on the network 120. In general, the client 160 includes a protocol stack configured to support both the dynamic packet header of the present invention and the standard network protocol. Specifically, the client 160 includes a binary large object (blob) layer 220, a network layer 230 and a transport layer 240 to interface the client 160 to the high bandwidth network 150 and the network 120.

In one embodiment, the network 120 and the high bandwidth network 150 are configured to operate in accordance with a reliable connectionless protocol. In general, the network 120 and the high bandwidth network 150 are channels for carrying data segments, and the reliable connectionless protocol is implemented over the sum of these two channels. For a further description of the reliable connectionless protocol, see U.S. patent application "A Reliable Connectionless Network Protocol", Ser. No. U.S. application Ser. No. 08/343,761, invented by Jeffrey C. Olkin, filed on Nov. 21, 1994, and assigned to the assignee of the present invention, Oracle Corporation. However, any reliable protocol that is either stream based or capable of supporting messages of arbitrary length may be used. For example, a TCP/IP may be used if a connection for the transmission of the blob over the high bandwidth network 150 is established prior to the receipt of the request for the blob. The blob layer 220 is configured to support the receipt of blobs with the dynamic packet header as is described more fully below.

As shown in FIG. 3, the blob layer 220 is coupled to the network layer 230. In turn, the network layer 230 is coupled to the transport layer 240. The network layer 230 and transport layer 240 are configured as a protocol stack to support the operation of the network 120 and the high bandwidth network 150. Also, the client 160 contains a physical layer (not shown) for both the high bandwidth network 150 and the network 120 to interface the client 160 to the high bandwidth network 150 and the network 120, respectively. The network layer 230 and transport layer 240 are intended to represent a broad category of network and transport layers for interfacing client agents to a network, which are well known in the art and will not be described further.

The transport layer 240 is coupled to applications 250. In general, the applications 250 implements one or more specific applications for the operation of the client 160. For example, in a media transport system, the applications 250 may execute a digital television converter function to convert digital video to a standard national television standards committee (NTSC) signal. Applications 250 is intended to represent a broad category of functions for implementing a broad range of client applications. For example, the applications 250 may be a software program operating in conjunction with a computer system (e.g. microprocessor and memory). The applications 250 may be configured to a wide variety of applications without deviating from the spirit and scope of the invention.

As shown in FIG. 3, the blob server 130 contains a blob pump file system 200. The blob pump file system 200 further includes a dynamic packet buffer 210. The dynamic packet buffer 210 is configured to store the control information received from the applications server 110. As is explained more fully below, the blob pump file system 200 retrieves selected blobs from the mass storage device 140, and generates the dynamic packet header based on the control information stored in the dynamic packet buffer 210.

APPLICATIONS SERVER

As discussed above, the applications server 110 may be implemented with a computer configured as a server coupled to the network 120. The applications server 110 contains addressing information to properly identify all clients operating on the network 120. In addition, the applications server 110 contains information to properly identify each client on the high bandwidth network 150. For example, in one embodiment, then the applications server 110 maintains a logical address and physical address for each client serviced on the high bandwidth network 150. For purposes of explanation, this addressing information is referred to as the designation identification (ID) for a particular client. The destination ID is part of the control information.

The applications server 110 receives requests from clients that contain an identification for the particular blob sought. The applications server 110 may use any type of indexing system to identify a blob stored in the mass storage device 140. The identification information is contained in the message transferred between the applications server 110 and the blob server 130. The identification information is stored in the dynamic packet buffer 210 so that the blob pump file system 200 may retrieve the appropriate blob.

In order to interface the applications server 110 to the blob server 130, a communications channel is required. Any communications channel that is capable of transmitting messages from the applications server 110 to the blob server 130 may be used. For example, the applications server 110 and blob server 130 may be coupled via a multi-point network, a point-to-point communications link, etc. Furthermore, any message protocol may be used to implement the applications server 110 to blob server 130 request. Transmitting messages passing between two computer devices, such as transmitting requests between applications server 110 and blob server 130, is well known in the art and will not be described further.

In addition to the designation ID, the networking protocol also includes a sequence identification for each packet within a blob. In general, the sequence identification identifies the sequence of packets contained within a particular blob. Blobs are stored in a pre-packetized format for the particular network protocol being implemented. However, in the sequence identification field, a serial sequence is assigned to each packet in the blob (e.g., first packet is assigned "one", the second packet is assigned "two", etc.). If the sequence ID started at the same number for all blobs, it would be difficult to separate duplicated and retransmitted blobs from new blobs. The sequence ID is used to uniquely identify a blob so that a particular client can ascertain the difference between more than one blob being transmitted. In a preferred embodiment, the assigning of sequence numbers for a finalized blob starts with assigning packet numbers at a random point within a 32-bit integer space. Therefore, as part of the control information, the applications server 110 transmits a sequence base that identifies a random point to begin the serial sequence numbers for a particular blob. The combination of the pre-assigned serial sequence numbers in a particular blob and the base sequence number assigned by the applications server 110 uniquely identifies the particular blob.

Also, the blob packets contain addressing information that specifies the location for data transmission and the location for returning acknowledgments for that particular message. Note that none of this information is known until the client request for the blob arrives at the applications server 110.

After the requesting client receives at least a portion of the blob, the requesting client transmits an acknowledgment message to the applications server 110. The acknowledgment protocol provides reliability for the data transport system. In one embodiment, the requesting client sends an acknowledgment after receipt of the entire blob.

In a second embodiment, the requesting client acknowledges, to the applications server 110, forward progress as packets are received. In this second embodiment, if some packets were not successfully received at the requesting client, only those packets are retransmitted. The forward progress acknowledgment scheme reduces network traffic and congestion, and reduces the time required to successfully deliver an entire blob. Furthermore, under some network conditions, receiving the entire blob at full network speeds may be impossible. Because of these certain network conditions, a protocol that retransmits the entire blob when a failure occurs may never be successful. In the preferred embodiment, the transport layer 240 and network layer 230 (FIG. 3) of the requesting client generates acknowledgments to the applications server 110 as part of the normal protocol.

BLOB SERVER AND CLIENT

As discussed above, blobs are stored on the mass storage device 140 in a pre-packetized format to conform to the specification of the network. However, because the destination of the blobs are not known when originally stored on the mass storage device 140, the packetized blobs do not contain a destination identification. In addition, as discussed above, the sequence identification pre-stored in each packet is not a unique number to that blob transmission, but merely identifies, starting from one, the order of packets within a particular blob. Therefore, although the blobs are pre-packetized to simplify retrieval, the unique or full sequence identification and the destination identification are left blank. This generalizes the pre-packetized blobs for all clients.

In a preferred embodiment for transferring digital video (blobs), the blob pump file system 200 is implemented, in part, with a video pump architecture. A fundamental requirement of the blob pump file system 200 is the ability to play large numbers of concurrent video streams (e.g., transmitting concurrent blobs). Consequently, the data transport system of the present invention takes advantage of the simplified blob server 130 architecture. For example, in the digital video (blob) application, the applications server 110 instructs the blob server 130 to play various segments of a particular blob just as a video server is commanded to play a movie.

The simplified protocol in the blob pump file system 200 is especially important for some video server architectures that can only support sending large amounts of data directly from disk (e.g., no run time processing of the data is allowed in the video server). Also, the data transport system of the present invention allows for the entire utilization of the high bandwidth network 150 under normal conditions. Without the use of such a simplified blob pump file system 200, the use of the entire bandwidth of the high bandwidth network 200 under normal conditions would be difficult if normal transmission and sliding protocols were used.

During run time, the blob file system 200 receives a request command from the applications server 110, and stores the associated control information in the dynamic packet buffer 210. The specific blob, identified in the applications server 110 command, is retrieved from the mass storage device 140. The blob pump file system 200 generates dynamic packet headers based on the control information stored in the dynamic packet buffer 210. The dynamic packet header is appended on the blob retrieved, and the entire blob, including the dynamic packet header, is transmitted to the requesting client.

Figure 4:
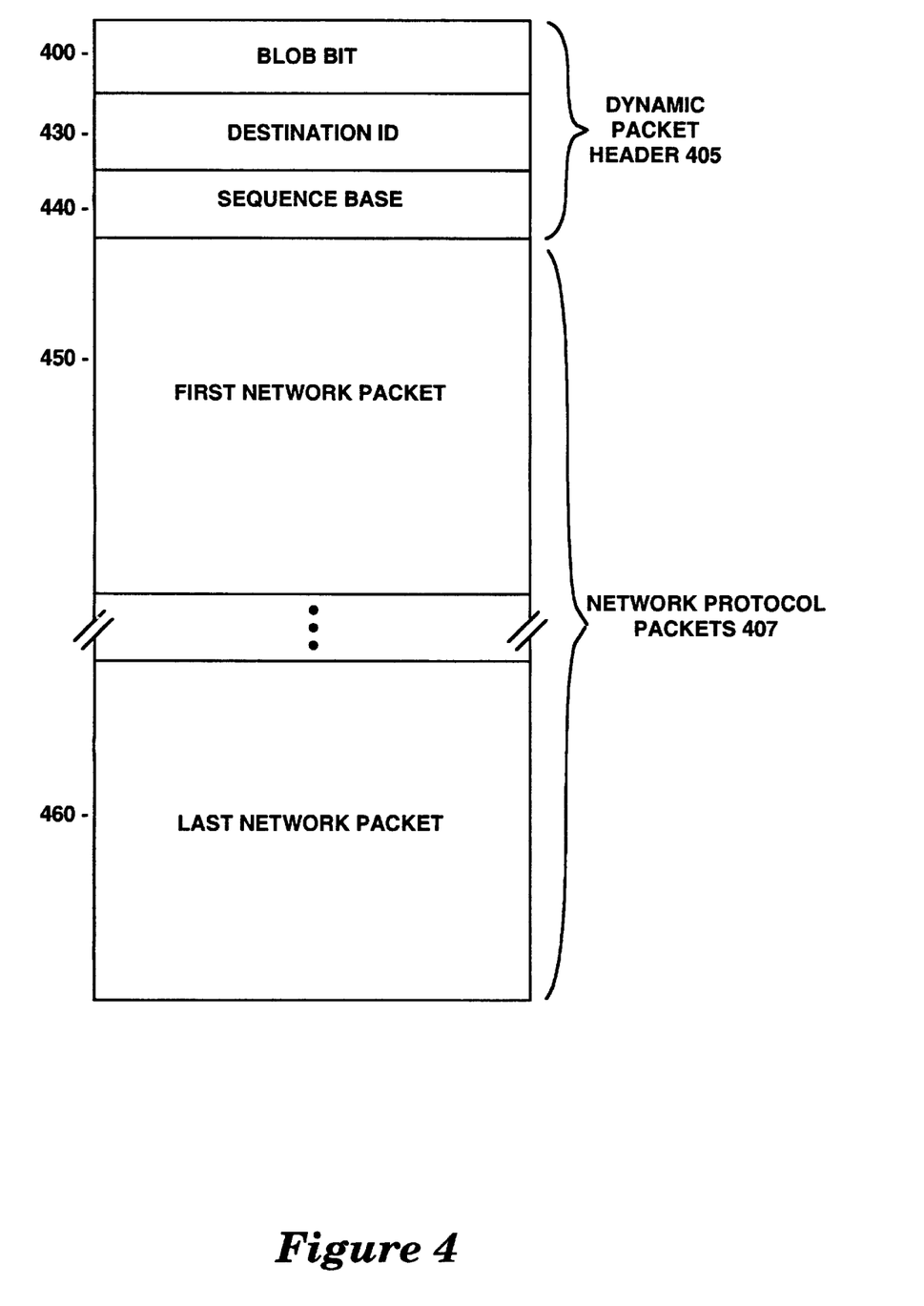
FIG. 4 illustrates a format for a packetized blob configured in accordance with one embodiment of the present invention.

FIG. 4 illustrates a format for a packetized blob configured in accordance with one embodiment of the present invention. As shown in FIG. 4, the packetized blob contains a dynamic packet header 405 and a plurality of network protocol packets 407. The dynamic packet header 405 includes a blob bit 400, a destination ID field 430, and a sequence base field 440. The network protocol packets contain a plurality of packets, such as a first network packet 450 and a last network packet 460. In general, the network protocol packets contain both data and control bits. The specific contents of the network protocol packets 407 depend upon the particular network specification being implemented. For example, in the modified TCP/IP implementation, the network protocol packets 407 contain TCP/IP formatted packets. The format of a network packet, such as a TCP/IP packet, is well known in the art and will not be described further.

Figure 5:
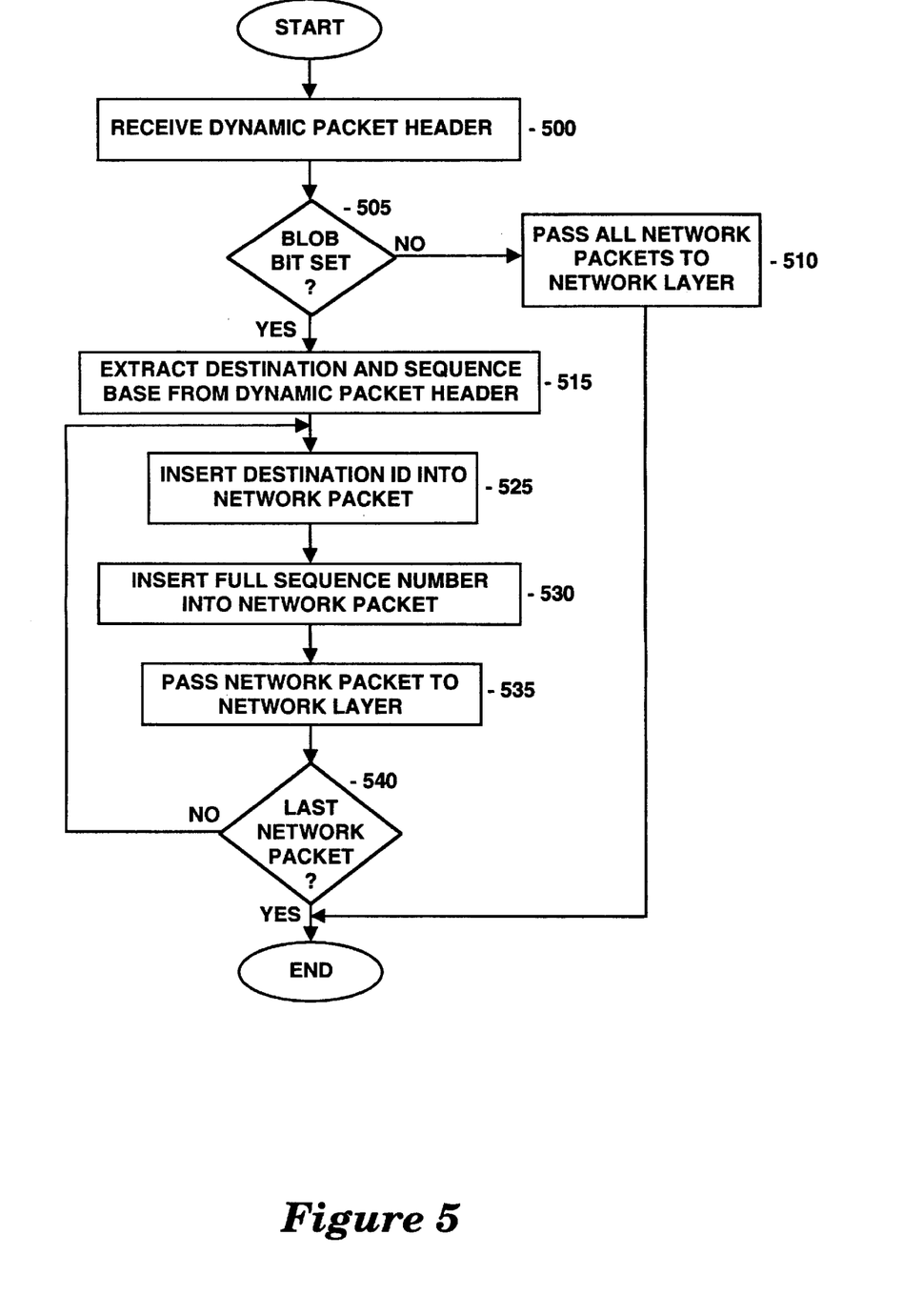
FIG. 5 is a flow diagram illustrating the operation of a blob layer configured in accordance with one embodiment of the present invention.

FIG. 5 is a flow diagram illustrating the operation of the blob layer 220 configured in accordance with one embodiment of the present invention. As shown in block 500, the blob layer 220 (FIG. 3) of the requesting client receives the blob requested including the dynamic packet header. In one embodiment, the blob layer 220 utilizes the address in the destination ID field 430 to determine whether the blob is intended for that particular client (e.g. the requesting client). The blob bit is used to enable the operation of the blob layer 220. If the blob bit is set, the blob layer 220 extracts the designation ID and sequence base from the dynamic packet header as shown in blocks 505 and 515. Alternatively, if the blob bit is not set, then the blob layer 220 passes all subsequent data packets to the network layer 230 as shown in blocks 505 and 510.

As shown in block 525, the blob layer 220 receives the network packets, and inserts the designation ID from the dynamic packet header 405 into the network packet in the appropriate field. For the modified TCP/IP implementation, the designation ID is inserted directly into a destination ID field. The blob layer 220 calculates the full sequence number for the network packet. In order to accomplish this, the blob layer 220 extracts a sequence number from each network packet, and adds the sequence number contained in the network packet to the sequence base received in the dynamic packet header 405.

The blob layer 220 inserts the full sequence number into the network packet as shown in block 530 in FIG. 5. At this point, the network packet is passed to the network layer 230 as shown in block 535. If no errors are detected, the transport layer 240 initiates the acknowledgment transfer to the applications server 110 via the network 120. As shown in block 540, for each network packet, blocks 525, 530 and 535 are executed. The control information is inserted into each network packet such that the packets conform to, in the preferred embodiment, the modified TCP/IP standard.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for storing and transferring data to at least one client on a network, said method comprising the steps of:

arranging data in packets compatible with a network protocol, said packets being generalized to exclude control information pertaining to a particular client;

storing said packets in a storage device accessible to a first server prior to receiving requests for said packets;

receiving a request of data from a requesting client at said first server, said request including control information to identify said requesting client;

accessing, at said first server, said storage device to retrieve packets corresponding to data requested;

modifying said packets at said first server to include a dynamic packet header based on said control information received from said requesting client;

transferring said packets and said dynamic packet header together from said first server to said requesting client over said network; and modifying said packets at said requesting client in accordance with said control information for each of said packets to conform said packets to said network protocol.

2. The method as set forth in claim 1, wherein the step of requesting data by a requesting client comprising the steps of:

generating a first request to a second server from said requesting client to request data stored in said storage device; and generating a second request, from said second server, to said first server to transmit said data requested including transferring control information to identify said requesting client.

3. The method as set forth in claim 1, wherein the step of modifying said packets to include said dynamic packet header comprises the steps of:

generating said dynamic packet header comprising said control information; and appending said dynamic packet header to said packets.

4. The method as set forth in claim 1, wherein said control information comprises:

a destination identification that identifies said requesting client; and a sequence base that identifies uniquely identifies said request.

5. The method as set forth in claim 4, wherein the step of arranging data in packets compatible with a network protocol comprises the steps of:

designating a destination identification field and a sequence number field for each packet; and specifying a sequence number, in said sequence number field, for each packet, wherein said sequence number identifies each packet of said data request in a sequential order.

6. The method as set forth in claim 4, wherein the step of modifying said packets at said requesting client comprises the steps of:

retrieving said destination identification and base sequence number;

generating a full sequence number for each packet by adding said base sequence number to said sequence number;

writing said destination identification in said destination identification field; and writing said full sequence number in said sequence number field.

7. The method as set forth in claim 1, wherein said network comprises a TCP/IP network.

8. The method as set forth in claim 1, wherein said data comprises binary large objects (blobs).

9. The method as set forth in claim 1, wherein:

said data comprises digital video; and said requesting client comprises a set top converter box.

10. An apparatus for storing and transferring data to at least one client on a network, said apparatus comprising:

means for arranging data in packets compatible with a network protocol, said packets being generalized to exclude control information pertaining to a particular client;

means for storing said packets in a storage device accessible to a first server prior to receiving requests for said packets;

means for receiving a request of data from a requesting client at said first server, said request including control information to identify said requesting client;

means for accessing, at said first server, said storage device to retrieve packets corresponding to data requested;

means for modifying said packets at said first server to include a dynamic packet header based on said control information received from said requesting client;

means for transferring said packets and said dynamic packet header together from said first server to said requesting client over said network; and means for modifying said packets at said requesting client in accordance with said control information for each of said packets to conform said packets to said network protocol.

11. The apparatus as set forth in claim 10, wherein said means for requesting data by a requesting client comprises:

means for generating a first request to a second server from said requesting client to request data stored in said storage device; and means for generating a second request, from said second server, to said first server to transmit said data requested, including means for transferring control information to identify said requesting client.

12. The apparatus as set forth in claim 10, wherein said means for modifying said packets to include said dynamic packet header comprises:

means for generating said dynamic packet header comprising said control information; and means for appending said dynamic packet header to said packets.

13. The apparatus as set forth in claim 10, wherein said control information comprises:

a destination identification that identifies said requesting client; and a sequence base that identifies uniquely identifies said request.

14. The apparatus as set forth in claim 13, wherein said means for arranging data in packets compatible with a network protocol comprises:

means for designating a destination identification field and a sequence number field for each packet; and means for specifying a sequence number, in said sequence number field, for each packet, wherein said sequence number identifies each packet of said data request in a sequential order.

15. The apparatus as set forth in claim 13, wherein said means for modifying said packets at said requesting client comprises:

means for retrieving said destination identification and base sequence number;

means for generating a full sequence number for each packet by adding said base sequence number to said sequence number;

means for writing said destination identification in said destination identification field; and means for writing said full sequence number in said sequence number field.

16. The apparatus as set forth in claim 10, wherein said network comprises a TCP/IP network.

17. The apparatus as set forth in claim 10, wherein said data comprises binary large objects (blobs).

18. The apparatus as set forth in claim 10, wherein:

said data comprises digital video; and said requesting client comprises a set top converter box.

* * * * *